United States Patent Office 3,062,711
Patented Nov. 6, 1962

3,062,711
COMPOSITION FOR TREATING FROTHY BLOAT IN RUMINANTS
Karl A. Ratcliff, William A. Dorrance, and John P. Towey, Des Moines, Iowa, assignors, by mesne assignments, to Diamond Laboratories, Des Moines, Iowa, a limited partnership
No Drawing. Filed Oct. 16, 1956, Ser. No. 616,147
5 Claims. (Cl. 167—53)

This invention relates to improvements in the treatment for frothy bloat in ruminants.

The treatment of frothy bloat has been a difficult problem and has frequently required surgical means to relieve the distress. An advancement in such treatment including the use of an organic silicone or silicate is disclosed in Patent No. 2,635,981 (1953) wherein one of the inventors is the same as one of those in this case. The improved treatment as set forth in said patent contributes materially to the reduction of froth but does not affect or eliminate the cause of the same.

The present invention contemplates the reduction in the incidence and severity of bloat by the use of a water dispersible product including an antibiotic with silicone to be placed in the drinking water or on the feed.

Another important object herein is the provision of a pre-mixed anhydrous powder compound in a form that will provide a long storing period for the antibiotic and in which the silicone can be readily released when mixed in, or in contact with, an aqueous medium.

The ratio of organic acid to base in the finished bloat powder is such that the products formed when placed in water results in a buffer system having a pH of 5 to 6, which is the recommended optimum for maximum penicillin activity.

In accordance with this invention we prepare a mixture of penicillin, or penicillin salt, and silicone with an anhydrous organic acid, an inorganic carbonate or hydroxide and an anhydrous filler such as sucrose, common salt or anhydrous dextrose for introduction into the drinking water or for placing on the feed. A flavoring or sweetening agent, such as saccharin, may be included. In this composition the silicone which as such is not dispersible in water is absorbed and/or absorbed by the carbonate which upon reaction with the organic acid and when mixed with water forms a soluble compound by which process the silicone is released together with the water soluble penicillin, and is immediately available for therapeutic action.

We have had very satisfactory results in field tests from the use of procaine penicillin G, methyl silicone (known under the trade name of D. C. Antifoam A 120), citric acid anhydrous, magnesium carbonate and sucrose. The citric acid is dried and this can be accomplished at 125° F. for 18 to 24 hours or in any other suitable manner. The silicone is added to the magnesium carbonate and thoroughly mixed so as to be absorbed by the carbonate. To this is added the critic acid and then the procaine penicillin and sucrose and the entire mixture is run through an oscillating granulator for thorough blending and mixing. The following example illustrates typically useful products embodying this invention per pound of mixture:

| | Gms. |
|---|---|
| Procaine penicillin G | 17.509 |
| Methyl silicone | 22.680 |
| Citric acid anhydrous | 29.484 |
| Magnesium carbonate | 22.680 |
| Sucrose crystals | 361.247 |
| | 453.6 |

The recommended use of this product is one-half teaspoonful per animal to be administered in the drinking water or on a small amount of feed in the afternoon or evening prior to pasturing on bloat producing forage. An amount sufficient for only 24 hours should be placed in the drinking water because of the possible deterioration of the penicillin after it has been dissolved.

In the example given above it will be noted that the sucrose crystals serve to supply bulk as well as palatibility and otherwise does not affect the product. With such bulk eliminated, the effectiveness of the product as set forth may be accomplished by a dosage of approximately one-sixth teaspoonful per animal.

We claim:
1. An anhydrous composition comprising an organic silicone absorbed on magnesium carbonate so that said silicone is readily dispersible upon contact with water, anhydrous citric acid and a penicillin.
2. A composition according to claim 1 including a member of the group consisting of sucrose, sodium chloride and dextrose as a filler.
3. An anhydrous composition comprising a methyl silicone absorbed on magnesium carbonate so that said silicone is readily dispersible upon contact with water, anhydrous citric acid and a penicillin.
4. A composition according to claim 3 including a member of the group consisting of sucrose, sodium chloride and dextrose as a filler.
5. A composition according to claim 3 wherein the penicillin is procaine penicillin G.

References Cited in the file of this patent
UNITED STATES PATENTS

| 2,635,981 | Austin | Apr. 21, 1953 |
| 2,396,115 | Nicholls | Mar. 5, 1946 |

OTHER REFERENCES

Barrentine: J. Animal Science, vol. 15, No. 2, May 1956, pages 440–446.

McGregor: Silicones and Their Uses, 1954, McGraw-Hill, N.Y.C., pages 191 and 192.

Wood: Tablet Manufacture, 1904, Lippincott Co., Phila., Pa., page 35.

Silicones in Medicine and Surgery, McGregor, 1957, p. 17.